No. 851,733. PATENTED APR. 30, 1907.
L. A. DÉSY.
SCRAPER FOR ORANGE PEEL BUCKETS.
APPLICATION FILED FEB. 6, 1907.
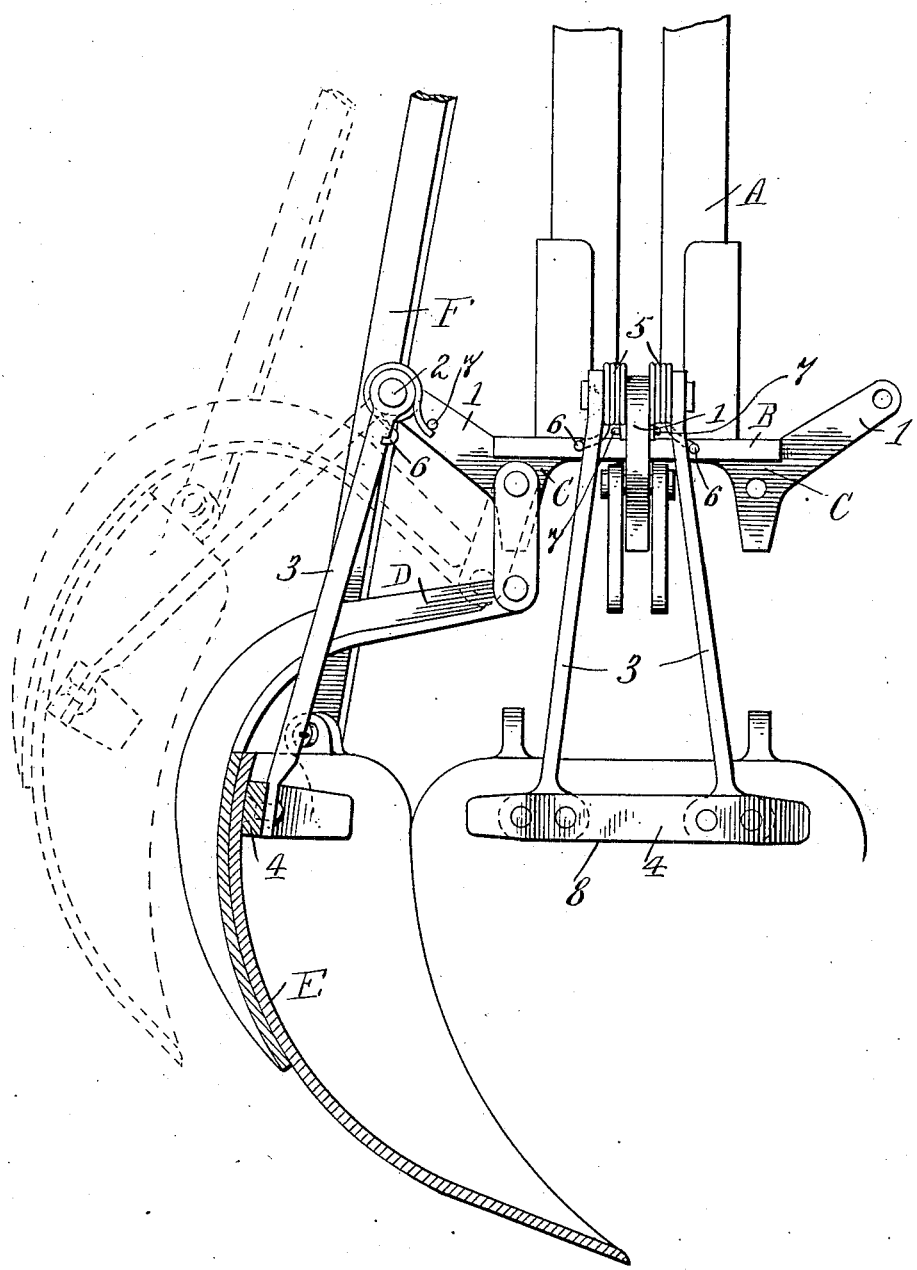

UNITED STATES PATENT OFFICE.

LOUIS ARSÉNE DÉSY, OF MONTREAL, QUEBEC, CANADA, ASSIGNOR TO JOSEPH WILLIAM HARRIS, OF MONTREAL, CANADA.

SCRAPER FOR ORANGE-PEEL BUCKETS.

No. 851,733.  Specification of Letters Patent.  Patented April 30, 1907.

Application filed February 6, 1907. Serial No. 356,116.

*To all whom it may concern:*

Be it known that I, LOUIS ARSÉNE DÉSY, a subject of the King of Great Britain, residing at the city and district of Montreal, in the Province of Quebec, Canada, have invented certain new and useful Improvements in Scrapers for Orange-Peel Buckets; and I do hereby declare that the following is a full, clear, and exact description of the invention, such as will enable others skilled in the art to which it appertains to make and use the same.

My invention relates to scrapers for excavator buckets of the type commonly called "orange peel" buckets; the object of my invention is to provide scrapers which are held against the inner faces of the leaves of the bucket, so that when the bucket is actuated into open position, the adhering material being dug will be scraped from the leaves, so that they present smooth surfaces; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which the figure is a side elevation, partly in section, showing the application of my invention.

Referring to the drawings, A designates a beam and B a shoe fixed to the lower end of the beam. The shoe B is provided with lugs C, to which are pivotelly connected the necks D of the leaves E. Links F are pivotally connected to the leaves E, and are adapted to actuate the leaves on their pivotal supports, to open or close the bucket. All of this construction may be of any known form.

The shoe B is provided on each side with projecting arms 1, adapted to receive the pins 2, on which are pivotally supported the links 3. Carried by the lower ends of the links 3 are scrapers 4. Coil springs 5 are disposed around the pins 2, and have their ends 6 attached to the links 3, and have their opposite ends bearing against the lugs 7 on the arms 1.

The scrapers 4 are provided with rounded edges 8, adapted to fit the contour of the inner wall of the leaves E, so as to remove all of the adhering material being dug.

The springs 5 are adapted to constantly maintain the rounded edges 8 in contact with the inner faces of the leaves E.

When the bucket is in the position shown in full lines, the scrapers 4 lie adjacent the upper edges of the leaves E. When the leaves E are actuated to the dotted line position by means of suitable actuating mechanism connected with the links F, the scrapers 4 being held immovable, assume the position shown in the dotted line position of the leaves, thus cleaning the upper portion of the leaves E. From practical experience, it has been found that it is not necessary for the scrapers 4 to travel the entire length of the leaves E, as the material being dug does not pack so much on the pointed ends of the leaves.

Having thus fully described my invention, what I claim as new, and desire to secure by Letters Patent, is:—

1. In combination with an orange peel bucket, scrapers mounted adjacent the inner faces of the leaves of the bucket, and means for maintaining the scrapers against the leaves.

2. In combination with an orange peel bucket, a plurality of scrapers, means for pivotally supporting the scrapers, and means for maintaining the scrapers against the inner faces of the leaves of the bucket.

3. In combination with an orange peel bucket, a plurality of scrapers, means for pivotally supporting the scrapers, and resilient means for maintaining the scrapers against the inner faces of the leaves of the bucket.

4. In combination with an orange peel bucket, a plurality of scrapers, means for pivotally supporting the scrapers, and springs coöperating with the supporting means and adapted to maintain the scrapers against the inner faces of the leaves of the bucket.

5. In combination with a beam having a shoe thereon and the leaves of an orange peel excavator bucket pivoted to the shoe, a plurality of scrapers pivotally supported by the shoe, and means for maintaining the scrapers against the faces of the leaves of the bucket.

6. In combination with a fixed shoe having supporting arms, pins disposed through the supporting arms, links pivotally supported by the pins, coiled springs wound around the pins and having one of their ends connected to the arms and their opposite ends connected to the links, and scrapers carried by the links.